Dec. 10, 1935.   H. W. ROYCE   2,023,445

CONTROL APPARATUS FOR HEATING SYSTEMS

Filed Nov. 12, 1934   2 Sheets-Sheet 1

Inventor:
Howard W. Royce
By:

Dec. 10, 1935.   H. W. ROYCE   2,023,445
CONTROL APPARATUS FOR HEATING SYSTEMS
Filed Nov. 12, 1934   2 Sheets-Sheet 2
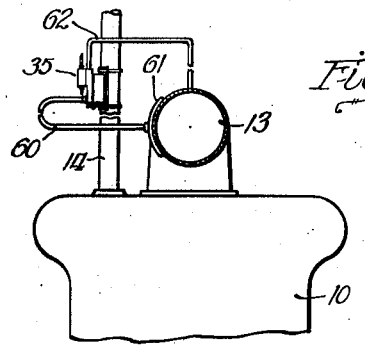
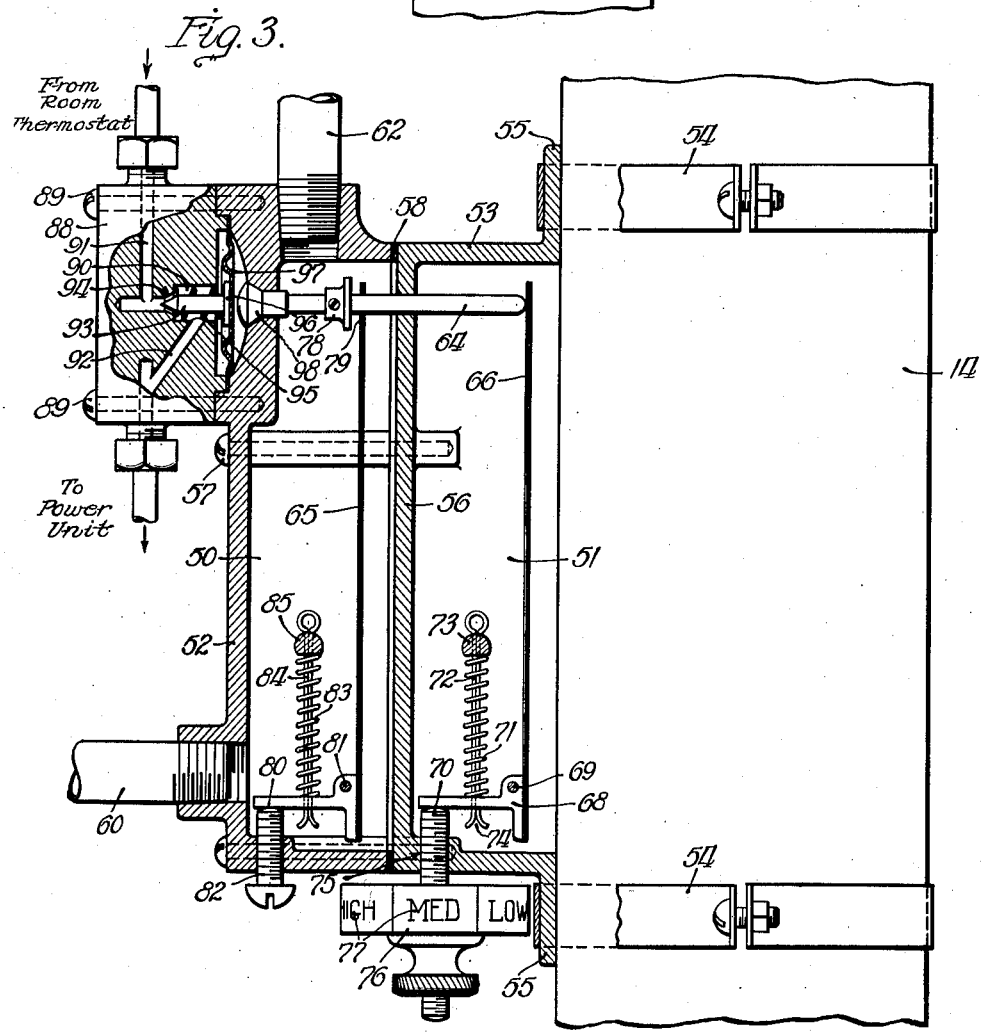
Inventor:
Howard W. Royce
By: Brown, Jackson, Boettcher & Dienner
Attys.

Patented Dec. 10, 1935

2,023,445

UNITED STATES PATENT OFFICE 2,023,445

CONTROL APPARATUS FOR HEATING SYSTEMS

Howard W. Royce, Chicago, Ill., assignor to Frank B. Thacher, Chicago, Ill.

Application November 12, 1934, Serial No. 752,565

11 Claims. (Cl. 236—9)

My invention relates to heating systems, and more particularly to a control apparatus therefor.

While the particular system which I shall describe hereinafter in connection with the drawings is a heating system of the type disclosed in my copending application Serial No. 623,135, filed July 18, 1932, it is to be understood that the present invention is not limited to use with this particular system but may be employed in other heating systems as suitable or desired.

Furthermore, although the invention is illustrated and will be described as utilizing certain preferred apparatus, it is to be understood that the principle of control which forms the basis of the present invention may employ quite different instrumentalities than those shown for producing the desired results.

The appended claims therefore are intended to cover not only the illustrated apparatus, but all equivalent apparatus for carrying out the purposes of this invention.

Heretofore, the heat generator has commonly been provided with control means comprising a thermostat actuated by the temperature of the room or other space to be heated, and some sort of device has usually been added to prevent overheating of the generator. With such equipment in connection with a gas fired generator, where the fire-box temperature responds immediately to thermostatic action, fairly good results may be attained, but even with generators of this sort there are undesirable fluctuations, or "ups" and "downs", in room temperature due to the thermal lag.

With the solid fuel or shovel-fired generator, this thermal lag becomes a serious problem as the generator outruns the room or other space and stores up excessive heat, which raises the temperature of the space above normal before the excessive heat is exhausted, and when the excess of heat is dissipated the generator temperature drops faster than the temperature of the room, and by the time the room has cooled to normal the generator is too cool and the room temperature will drop below requirements, resulting in a series of undesirable fluctuations, or "ups" and "downs", in the room temperature, and greater fluctuations, or "ups" and "downs", in the generator temperature.

To minimize this trouble heretofore, an adjustable temperature limiting device (variously known as an "Aquastat", "Limistat", etc.) frequently has been provided. These temperature limiting devices have been adapted to be set to allow the generator temperature to rise only slightly above that required to maintain the desired room temperature under outdoor conditions. These devices, if intelligently operated, will produce reasonably good regulation, but there are still other evils existing.

When the room thermostat calls for heat, the draft, for example, is opened wide and the fire may attain a very high temperature before the generator is up to the set limit, resulting in a serious loss of heat out the stack or chimney, if not, in fact, heating the flue to a danger point. With this waste and danger in view, it has been proposed to limit the fire by the use of a stack temperature control instead of limiting the generator temperature. This arrangement will give fair regulation as well as safety and economy, but it does not protect, under all conditions, the temperature of the generator from "creeping" too high.

The object of my present invention is to provide a control apparatus which will overcome the problems previously presented as above outlined.

Generally speaking, the invention consists in the combination with a thermostat, actuated by the temperature of the room or other space to be heated for controlling the generator, of a pair of thermostats, one actuated by the temperature of the generator and the other actuated by the stack temperature, and means actuated by these latter thermostats for limiting the action of the generator. In the more specific aspects of the invention, this last means is in the form of a single element actuated independently by either of said latter thermostats, and means is provided for separately adjusting each of said latter thermostats.

Numerous advantages, adaptations and modifications of the invention will be apparent from the following detailed description of the illustrated embodiment of the invention.

In order to acquaint those skilled in the art with the manner of constructing and operating a device for carrying out the purposes of the present invention, I shall now describe the illustrated embodiment of the invention in connection with the accompanying drawings, in which:

Figure 2 is a fragmentary view of the heat generator, taken at right angles to Figure 1 and showing the device of the present invention with other parts omitted for sake of clarity;

Figure 3 is a vertical sectional view through the device embodying the present invention, taken on the line 3—3 of Figure 1; and, Figure 4 is a fragmentary detail section taken on the line 4—4 of Figure 1.

Figures 1, 4:
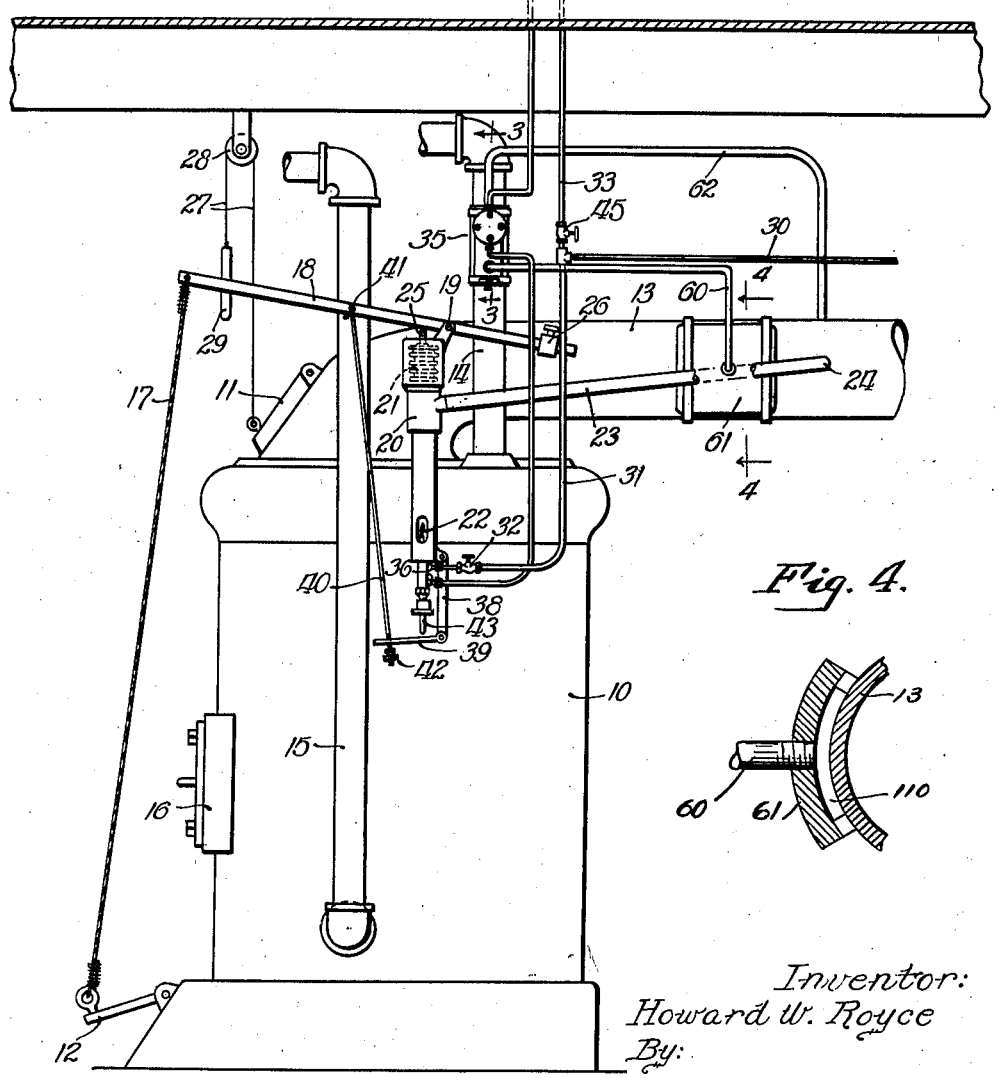
Figure 1 is a view of a heat generator showing an embodiment of the present invention in connection therewith.

Referring to the drawings, 10 represents the furnace or generator, 11 and 12 the control dampers therefor, 13 the smoke flue or stack, 14 the hot water riser or hot water outlet pipe, 15 the cold water return pipe, and 16 the fire door.

The damper 12 is connected by a wire, rod or like element 17, to a lever 18 which is pivoted at 19 to a power unit 20 which unit 20 is of the type disclosed in my copending application herein identified, to which application attention is directed for the full details of this device. Suffice it here to point out that this unit 20 has a thermostat 21 of the bellows type which overlies the power unit heater comprising, in the illustrated embodiment of the invention, a gas burner 22. The unit 20 has a lateral vent connected to a pipe 23 which, in turn, is connected at 24 to the smoke flue or stack 13 to carry unburned gases from the unit 20 to the chimney if, by chance, the gas supply for the burner 22 should fail unnoticed and afterwards resume.

The upper end of the bellows 21 has a stem 25 projecting out through the top of the unit 20 and tapered at its upper end for engagement in a tapered socket in the lever 18. Upon expansion of the fluid contained within the bellows 21, under the action of the burner 22, the bellows expands and the stem 25 lifts the lever 18 about the pivot 19 to open the damper 12 an amount in proportion to the size of the flame at the burner 22. Upon contraction of the bellows 21 the damper 12 may drop by gravity to or toward closed position an amount equal to the amount of contraction of the bellows. The closing movement of the damper may be augmented by a spring means or otherwise as desired. For the purpose of reducing the amount of work which must be done in lifting the lever 18 to open the damper, the right hand end of the lever 18 (Figure 1) is extended beyond the pivot 19 and provided with a counterweight 26. This counter-weight is adjustable, and by setting it to counter-balance approximately the damper 12, the work done by the bellows 21 in lifting the lever 18 need be only that necessary to overcome the state of balance between the damper 12 and the counter-weight 26.

A flexible element 27, connected to the check damper 11, is trained over a sheave 28 and has a lost motion connection at 29 with the lever 18. This connection 29 may be formed by a loop engaged over the lever 18. The element 27 opens the check damper 11 as the damper 12 is completely closed, and permits the check damper to close upon initial opening movement of the damper 12. At the same time, the lost motion connection permits the damper 12 to move the full and intermediate open positions independently of the check damper 11.

The burner 22 is of the Bunsen type.

The pipe 30, which may be one of the gas supply mains of the residence, or any other suitable or desired fuel supply line, has a branch pipe 31 leading therefrom and connected to the burner 22 for supplying to this burner gas or other fuel in quantities sufficient to maintain a restricted pilot flame at the burner. The branch pipe 31 has a valve 32 for adjusting the restricted supply of fuel and, thereby, the pilot flame at will.

The gas supply pipe 30 has another branch pipe 33 in which the room thermostat 34 and the device of the present invention, indicated in its entirety at 35, are connected. Beyond the thermostat 34 and the control device 35, the branch pipe 33 is connected at 36 to the burner 22 for the purpose of varying the flame at this burner with variations in the temperature of the space to be heated.

An arm 38, rigid with the lower end of the unit 20, has pivoted to its lower end a lever 39, and a rod 40, connected at 41 to the lever 18, passes at its lower end through an opening in the lever 39 and has threaded thereon a thumb nut 42. The rod or like member 40, with the nut 42 and lever 39, constitute a limiting connection between the lever 18 and a valve stem 43 for the purpose of limiting automatically the gas supply to the burner 22 by way of the pipe 33, and thereby the expansion of the bellows 21. Upon a predetermined lift or clockwise movement of the lever 18 about its pivot 19 under the expanding action of the bellows 21, the lever 39 strikes the lower end of the valve stem 43 and lifts the same to close off the entry of further gas from the connection 36 to the burner 22. The branch pipe 33 preferably has a suitable throttling valve 45 therein.

The room thermostat 34 is of the type disclosed in my copending application herein identified, and reference is made to that application for the details of one form of device suitable for present purposes. Suffice it here to point out that the thermostat 34 is connected into the gas supply pipe 33 and is provided with a valve 46 for controlling the flow of gas to the power unit by way of the pipe 33. The valve 46 is controlled by a thermostat 47 which is actuated by the room temperature and, in the illustrated embodiment of the invention, is of the bellows type. The arrangement is such as to provide at the thermostat 34 an effective metering valve for the gas, which valve lends itself to bringing the dampers, valves or other appliances to an intermediate position substantially balancing the heat requirements and to operation of these parts at substantially that position instead of only at wide open or completely closed position.

Now, in conjunction with the foregoing illustrative instrumentalities, I provide the device 35 (Figures 1 and 2) constituting the present invention. As shown in Figure 3, this device comprises a pair of compartments 50 and 51 formed by box-like receptacles 52 and 53, respectively. The receptacle 53 is clamped to some convenient part of the generator 10, as for example, to the hot water riser or outlet pipe 14. Bands 54, encircling the pipe 14, and flanges 55, at the open side of the receptacle 53, provide a suitable attachment which, of course, may vary widely within the scope of the present invention.

The outer side of the receptacle 53 is closed by a wall 56 which constitutes a separating partition between the compartments 50 and 51, and the outer receptacle 52 has its open inner side clamped to the closed outer side of the receptacle 53, as by means of suitable bolts 57. A suitable gasket 58 may be provided between the closed side of the receptacle 53 and the open side of the receptacle 52.

The outer compartment 50 is connected at the bottom with a tube 60 extending from a saddle 61 clamped to the outside of the smoke pipe or stack 13 and at the top with a tube 62, which tube 62 at its opposite end enters the stack 13. The saddle 61 has its outer wall spaced from the stack 13 as shown in Figure 4, and the space 110 therebetween is open to atmosphere for the circulation of air therethrough. There is, therefore, continually circulated through the compartment 50 air that is at practically the same temperature as the stack 13. The interior of the compartment 51 being exposed directly to the hot water pipe 14 is practically at the same temperature as the generator.

The action of the generator 10 is limited by a single element which, in the illustrated embodiment of the invention, is in the form of a push pin 64. This pin is actuated independently by either of a pair of thermostats 65 and 66, one disposed within the compartment 50 and actuated by the temperature within that compartment—and thereby by the stack temperature—and the other disposed within the compartment 51 and actuated by the temperature in this latter compartment—and thereby by the generator temperature.

The thermostat 66 comprises a bi-metallic strip, the upper end of which is arranged to act upon the end of the pin 64. The lower end of this bi-metallic strip is secured to one arm of a bell crank lever 68 pivoted at 69 within the receptacle 53. The other arm of the lever 68 is held yieldingly in engagement with the inner end of an adjusting screw 70 by means of a spring 71. The spring 71 is coiled about a cotter pin 72 passing through a cross shaft 73 and down through the adjacent arm of the lever 68. The lower end of the pin 72 is spread at 74, and the spring 71 abuts at opposite ends the cross shaft 73 and the arm of the lever 68 and is confined therebetween yieldingly to hold the arm of the lever in engagement with the adjusting screw 70. The screw 70 is threaded at 75 in the bottom of the receptacle 53, and has a dial 76 with suitable temperature markings 77 and operable to adjust the thermostat 66 to different weather conditions.

The thermostat 65 comprises a bi-metallic strip, the upper end of which is arranged to act upon a collar or other suitable abutment 78 fixed upon the push pin 64. This upper end of the strip 65 may be slotted or provided with an opening 79 to permit the pin 64 to pass therethrough, this pin also passing slidingly through the wall 56. The lower end of the bi-metallic strip 65 is secured to one arm of a bell crank lever 80 pivoted at 81 within the recepacle 52. The other arm of the lever 80 is held yieldingly in engagement with the inner end of an adjusting screw 82 by means of a spring 83 coiled about a cotter pin 84. This cotter pin, like the pin 72, passes through a cross shaft 85 and down through the arm of the lever 80, the lower end of the pin being spread as shown. The screw 82 is set for the maximum stack temperature decided upon and is operable to adjust the thermostat 65 for different maximum stack temperatures.

The actuation of the pin 64 may operate a valve, electric control device, or other means for limiting the action of the generator. In the illustrated embodiment of the invention, the room thermostat controls the gas supply to the power unit 20, and therefore this control means is in the form of a valve 88. Where an electrical control is employed, the means for limiting the action of the generator may be in the form of a circuit controlling contact arrangement, and other controls may be provided within the scope of the present invention.

The valve 88 comprises a valve body secured by bolts 89 to the receptacle 52 adjacent the left-hand end (Figure 3) of the pin 64. The valve body has formed therein a valve chamber 90. A duct 91 extends through the valve body into the chamber 90 and is connected at its outer end to the gas tube leading from the room thermostat. A second duct 92 extends through the valve body from the chamber 90, and is connected at its outer end to the gas tube leading to the power unit 20. Communication between the duct 91 and the duct 92 is controlled by a valve member 93 having a tapered end adapted to engage the seat 94 to cut off entirely communication between the ducts 91 and 92, and this valve member is held yieldingly in open position by a spring 95 interposed between the shoulder formed by the reduced end of the valve chamber 90 and a button 96 on the other end of the valve member. A diaphragm 97 clamped between the valve body and the receptacle 52 seals the valve chamber 90, and the left-hand end (Figure 3) of the push pin 64 has a head 98 which, upon actuation of the pin 64 to the left by either of the thermostats 65 or 66, acts through the diaphragm 97 to press the valve 93 to its seat 94, thereby shutting off the gas supply to the power unit through the connected tubes whenever the stack temperature reaches the maximum temperature for which the thermostat 65 is set, or whenever the generator temperature reaches the temperature for which the thermostat 66 is set.

From the foregoing, it will now be apparent that I have provided for perfect regulation by means of both generator and stack control in conjunction with the usual room control. Furthermore, I provide a single device, and operate this single device by either of two temperature sensitive elements, one actuated by the generator temperature, the other by the stack temperature, and both are adjustable, yet each works independently of the other.

In the case of an electrical control, a control contact device may be employed instead of the valve 88, and, instead of the connected tubes from the room thermostat and to the power unit, there will be wires connected to the desired contacts of such device with the push pin 64 arranged to control the contacts and, thereby, the electrical circuit for producing the desired action in the heat generator of the system.

I claim:

1. In a heating system, a heat generator having a stack and adapted for heating a space, means for controlling said generator and comprising a thermostat actuated by the temperature of said space, a pair of thermostats, one actuated by the temperature of said generator and the other actuated by the stack temperature, and a single element operable to limit the action of said generator and actuated mechanically and independently by either of said last thermostats.

2. In a heating system, a heat generator having a stack and adapted for heating a space, means for controlling said generator and comprising a thermostat actuated by the temperature of said space, a pair of thermostats, one actuated by the temperature of said generator and the other actuated by the stack temperature, a single element operable to limit the action of said generator and actuated mechanically and independently by either of said last thermostats, and means for separately adjusting each of said last thermostats.

3. In a heating system, a heat generator having a stack and adapted for heating a space, means for controlling said generator and comprising a thermostat actuated by the temperature of said space, a casing clamped to a part of the generator, a second casing connected by a tube with a saddle clamped to the stack and with a tube entering the stack whereby there is circulated through said second casing air at substantially the same temperature as the stack temperature, a pair of thermostats, one in each of said casings, and a single element operable to limit the action of said generator and actuated independently by either of said last thermostats.

4. In a heating system, a heat generator having a stack and adapted for heating a space, means for controlling said generator and comprising a thermostat actuated by the temperature of said space, a casing clamped to a part of the generator, a second casing connected by a tube with a saddle clamped to the stack and with a tube entering the stack whereby there is circulated through said second casing air at substantially the same temperature as the stack temperature, a pair of thermostats, one in each of said casings, a single element operable to limit the action of said generator and actuated independently by either of said last thermostats, a control for adjusting the thermostat in said first casing according to weather conditions, and a control for adjusting the thermostat in said second casing to the desired maximum stack temperature.

5. In combination, a heat generator having a stack and adapted for heating a space, a thermostat, means operable by said thermostat for regulating said generator, a burner for heating said thermostat, a line for supplying fuel to said burner, a thermostat subject to the temperature of the space and controlling said fuel supply line with variations in the temperature of said space, and thermal sensitive means actuated by the temperature of the stack and by the generator temperature for controlling said fuel supply line to limit the action of the generator.

6. In combination, a heat generator having a stack and adapted for heating a space, a thermostat, means operable by said thermostat for regulating said generator, a burner for heating said thermostat, a line for supplying fuel to said burner, a thermostat subject to the temperature of the space and controlling said fuel supply line with variations in the temperature of said space, a valve in said fuel supply line, a casing clamped to a part of the generator, a second casing connected by a tube with a saddle clamped to the stack and with a tube entering the stack, and a pair of thermostats, one in each of said casings and each operable to actuate said valve.

7. In a heating system, a heat generator, a hot water outlet pipe, a dual compartment casing structure clamped to said pipe, a valve device associated with said casing structure and operable to limit the action of said generator, a plunger for operating said valve device, and a pair of thermostats, one in each of the compartments of said casing structure and each operable to actuate said plunger.

8. In a heating system, a heat generator having a stack and adapted for heating a space, a thermostat responsive to the temperature of the generator, a second thermostat responsive to the stack temperature, and a device for limiting the action of the generator and comprising a movable member common to both said thermostats and actuated mechanically and independently by each of said thermostats.

9. In a heating system, a heat generator having a stack and adapted for heating a space, a thermostat responsive to the temperature of the generator, a second thermostat responsive to the stack temperature, and a valve device for limiting the action of the generator and comprising a movable valve stem common to both said thermostats and actuated mechanically and independently by each of said thermostats.

10. In a heating system, a heat generator having a stack and adapted for heating a space, a thermostat responsive to the temperature of the generator, a second thermostat responsive to the stack temperature, a device for limiting the action of the generator and comprising a movable member common to both said thermostats and actuated mechanically and independently by each of said thermostats, and means for adjusting each of said thermostats.

11. In a heating system, a heat generator having a stack and adapted for heating a space, a thermostat, means operable by said thermostat for regulating said generator, a burner for heating said thermostat, a line for supplying fuel to said burner, a valve in said fuel supply line, and thermal sensitive means responsive to the temperature of the stack and the generator temperature for controlling said valve to limit the action of the generator.

HOWARD W. ROYCE.